United States Patent
Chiba et al.

(10) Patent No.: US 9,522,637 B2
(45) Date of Patent: Dec. 20, 2016

(54) VEHICULAR EXTERIOR MEMBER ATTACHING STRUCTURE AND ATTACHING METHOD

(71) Applicants: KABUSHIKI KAISHA TOYOTA JIDOSHOKKI, Aichi (JP); TOYOTA JIDOSHA KABUSHIKI KAISHA, Aichi-ken (JP); Kenji Chiba, Toyota-shi (JP)

(72) Inventors: Kenji Chiba, Tokai (JP); Muneaki Inagaki, Kariya (JP)

(73) Assignees: KABUSHIKI KAISHA TOYOTA JIDOSHOKKI, Aichi (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/647,265

(22) PCT Filed: Nov. 25, 2013

(86) PCT No.: PCT/JP2013/081674
§ 371 (c)(1),
(2) Date: May 26, 2015

(87) PCT Pub. No.: WO2014/084176
PCT Pub. Date: Jun. 5, 2014

(65) Prior Publication Data
US 2015/0298632 A1  Oct. 22, 2015

(30) Foreign Application Priority Data
Nov. 27, 2012 (JP) ................. 2012-258747

(51) Int. Cl.
*B60R 13/04* (2006.01)
*B60R 19/24* (2006.01)
*B60R 19/18* (2006.01)

(52) U.S. Cl.
CPC ............... *B60R 13/04* (2013.01); *B60R 19/24* (2013.01); *B60R 2019/1886* (2013.01)

(58) Field of Classification Search
CPC ... B60R 13/04; B60R 2019/1886; B60R 19/24
(Continued)

(56) References Cited
U.S. PATENT DOCUMENTS 4,355,842 A * 10/1982 Hira .................. B60R 13/04
                                                 280/164.2
5,433,498 A *  7/1995 Ishiwata ............ B60R 13/0206
                                                 24/625
(Continued)

FOREIGN PATENT DOCUMENTS

EP          1 375 255 A2       1/2004
JP          2002-326548 A     11/2002
(Continued)

OTHER PUBLICATIONS

International Preliminary Report on Patentability issued by the International Searching Authority in counterpart International Application No. PCT/JP2013081674.

*Primary Examiner* — Jason S Morrow
(74) *Attorney, Agent, or Firm* — Sughrue Mion, PLLC

(57) ABSTRACT

A vehicle exterior member attaching structure for attaching a vehicle exterior member onto a protruding target location of a vehicle includes a vehicle engagement portion located at a target section, an attachment hole located at the target section, a covering portion located on the vehicle exterior member, an engagement portion located on the covering portion and configured to be engaged with the vehicle engagement portion, and an attachment piece located on the covering portion and configured to be inserted into the attachment hole. The covering portion and the attachment piece are integrally formed with a portion of the attachment (Continued)

piece connected to the covering portion forming a thin integral hinge.

7 Claims, 5 Drawing Sheets

(58) Field of Classification Search
 USPC .................. 296/1.08; 52/716.5, 716.6, 717.7
 See application file for complete search history.

(56) References Cited

U.S. PATENT DOCUMENTS

| | | | |
|---|---|---|---|
| 2010/0259027 A1* | 10/2010 | Buck .......................... | B60R 3/00 280/166 |
| 2011/0027522 A1* | 2/2011 | Kubo ...................... | B60R 13/04 428/99 |
| 2011/0127797 A1* | 6/2011 | Garnett ...................... | B60J 5/04 296/146.5 |
| 2012/0119532 A1* | 5/2012 | She ....................... | B60R 13/025 296/1.08 |

FOREIGN PATENT DOCUMENTS

| | | |
|---|---|---|
| JP | 2002-362265 A | 12/2002 |
| JP | 2003-212070 A | 7/2003 |
| JP | 2004-017879 A | 1/2004 |
| JP | 2007137410 A | 6/2007 |
| JP | 2007261480 A | 10/2007 |
| JP | 2008-087206 A | 4/2008 |
| JP | 2010-000839 A | 1/2010 |
| JP | 2010-083477 A | 4/2010 |
| JP | 201083250 A | 4/2010 |

\* cited by examiner

VEHICULAR EXTERIOR MEMBER ATTACHING STRUCTURE AND ATTACHING METHOD

CROSS REFERENCE TO RELATED APPLICATIONS

This application is a National Stage of International Application No. PCT/JP2013/081674 filed Nov. 25, 2013, claiming priority based on Japanese Patent Application No. 2012-258747, filed Nov. 27, 2012, the contents of all of which are incorporated herein by reference in their entirety.

TECHNICAL FIELD

The technology of the present disclosure relates to an attachment structure and an attachment method for attaching a vehicle exterior member, which is formed integrally with an attachment piece that includes an integral hinge, to a target section of a vehicle.

BACKGROUND ART

In recent years, various vehicle exterior members have been proposed that include integral hinges for easier attachment to a vehicle.

For example, Patent Document 1 discloses a vehicle bumper that includes a bumper main body, a holding piece, and a support piece that are formed integrally of plastic. The holding piece projects in the horizontal direction from the vicinity of the center of the bumper main body. An integral hinge connects the support piece to the lower end of the bumper main body. In this vehicle bumper, after the bumper main body is attached to a vehicle, the support piece is pivoted upward about the integral hinge. The pivoted support piece is connected to the holding piece and held at a predetermined angle. A grommet fixes the distal end of the pivoted support piece to the vehicle.

PRIOR ART DOCUMENT

Patent Document

Patent Document 1: Japanese Laid-Open Patent Publication No. 2002-326548

SUMMARY OF THE INVENTION

Problems that the Invention is to Solve

In Patent Document 1, the support piece (attachment piece), which includes the integral hinge, is used only when the vehicle exterior member is finally fixed to the vehicle and is not used when the bumper main body of the vehicle exterior member is first attached to the vehicle.

In general, when a relatively large or long vehicle exterior member, such as a vehicle bumper, is first attached to a vehicle, a guide member, which differs from a support piece (attachment piece) including an integral hinge, is required to facilitate assembly. This complicates the structure of the vehicle exterior member.

Accordingly, it is an objective of the present disclosure to provide an attachment structure and an attachment method for a vehicle exterior member that facilitate assembly by arranging a guide portion in a vehicle exterior member, which is formed integrally with an attachment piece, and simplify the structure of the vehicle exterior member.

Means for Solving the Problems

To achieve the foregoing objective and in accordance with one aspect of the present invention, an attachment structure for a vehicle exterior member is provided. The attachment structure attaches a vehicle exterior member to a protruding target section of a vehicle that includes a first side and a second side. The vehicle exterior member is curved to cover the target section. The attachment structure includes a vehicle engagement portion located on the first side of the target section, an attachment hole located on the second side of the target section, a covering portion, an engagement portion, and an attachment piece. The covering portion is located in the vehicle exterior member and configured to cover the target section. The covering portion includes a first side and a second side. The engagement portion is located on the first side of the covering portion and configured to engage with the vehicle engagement portion of the target section. The attachment piece is located on the second side of the covering portion and configured to be inserted into the attachment hole of the target section. The covering portion and the attachment piece are formed integrally of plastic. A section of the attachment piece that is connected to the covering portion forms a thin integral hinge. When the attachment piece is inserted into the attachment hole, the attachment piece positions the covering portion at a temporary position relative to the target section. When the covering portion is pulled toward the vehicle engagement portion and the attachment piece is pressed against a rim of the attachment hole, the attachment piece pivots in a direction opposite to a direction in which the covering portion is pulled while remaining inserted in the attachment hole. When the covering portion covers the target section and is positioned in a desired position, the attachment piece returns to an original position and maintain engagement between the vehicle engagement portion and the engagement portion.

In accordance with another aspect of the present invention, a method for attaching a vehicle exterior member is provided. The method attaches a vehicle exterior member to a protruding target section of a vehicle that includes a first side and a second side. The vehicle exterior member is curved to cover the target section. The target section includes a vehicle engagement portion on the first side. The target section includes an attachment hole on the second side. The vehicle exterior member includes a covering portion that is configured to cover the target section and includes a first side and a second side. The covering portion includes on its first side an engagement portion that is configured to engage with the vehicle engagement portion of the target section. The covering portion includes on its second side an attachment piece that is configured to be inserted into the attachment hole of the target section. The covering portion and the attachment piece are formed integrally of plastic. A section of the attachment piece that is connected to the covering portion forms a thin integral hinge. The method includes: positioning the covering portion in a temporary position relative to the target section by inserting the attachment piece into the attachment hole; pulling the covering portion toward the vehicle engagement portion such that the pressing piece is pressed against a rim of the attachment hole and pivots in a direction opposite to a direction in which the covering portion is pulled while remaining inserted in the attachment hole; and positioning the covering portion such that the covering portion covers the target section and is positioned in a desired position, wherein the attachment part returns to an original position and maintains engagement between the vehicle engagement portion and the engagement portion.

MODES FOR CARRYING OUT THE INVENTION

Figure 1:
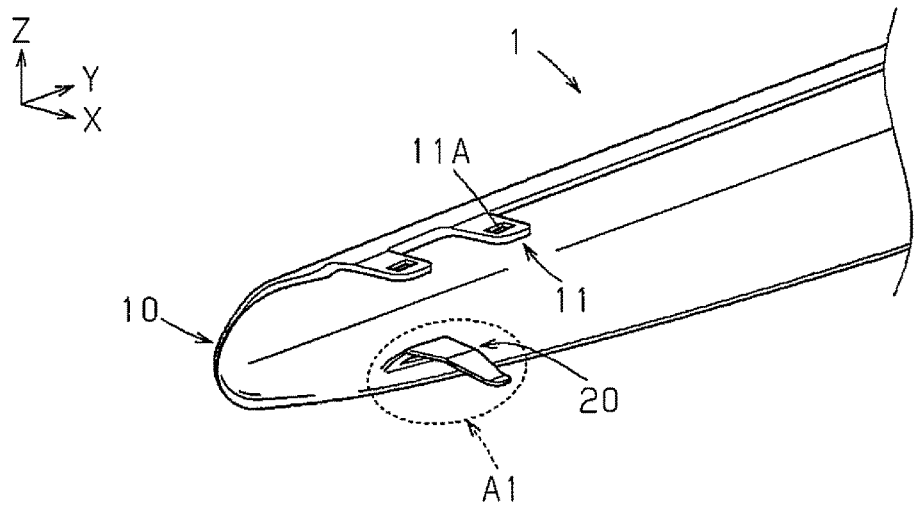
FIG. 1 is a perspective view showing the structure for a vehicle exterior member.

Referring to the drawings, an attachment structure for a vehicle exterior member according to one embodiment will now be described. The attachment structure attaches a vehicle exterior member 1, which is formed integrally with an attachment piece 20 that includes an integral hinge, to a target section of a vehicle.

[Overall Structure of Vehicle Exterior Member 1 (FIGS. 1 to 3)]

Figure 2:
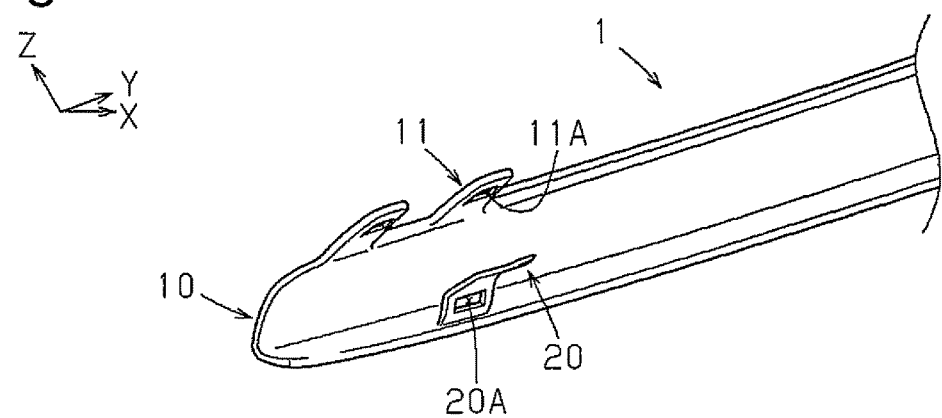
FIG. 2 is a perspective view showing the vehicle exterior member in FIG. 1 from a different angle.

As shown in FIGS. 1 and 2, the vehicle exterior member 1, such as a vehicle bumper molding, includes a covering portion 10 and the attachment piece 20.

Figure 3:
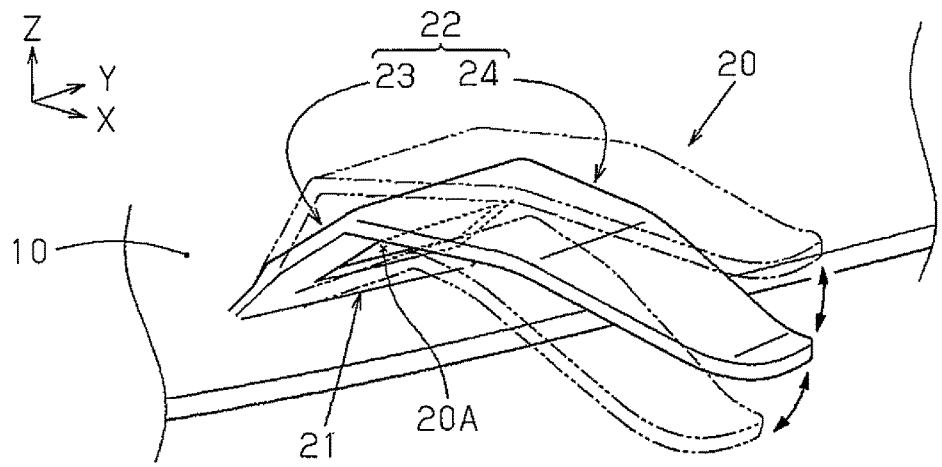
FIG. 3 is an enlarged view of region A1 (attachment piece) indicated by the broken line in FIG. 1.

A bumper molding is a vehicle exterior member attached to the front and rear ends of a vehicle. In FIGS. 1 to 3, the X direction, the Y direction, and the Z direction are perpendicular to each other. The Z direction extends upward in the vertical direction. The X diction is the vehicle rear (or front) direction, and the Y direction is the vehicle right (or left) direction.

FIG. 1 is a perspective view showing the vehicle exterior member 1. FIG. 2 is a perspective view showing the vehicle exterior member 1 from an angle that differs from the angle in FIG. 1 to clearly show a through hole 20A of the attachment piece 20. FIG. 3 is an enlarged view of the region A1 indicated by the broken line in FIG. 1 and shows that the attachment piece 20 is pivotal about an integral hinge 21 as indicated by the long dashed double-short dashed lines.

The covering portion 10 is curved to cover a protruding target section of a vehicle.

Figure 4:
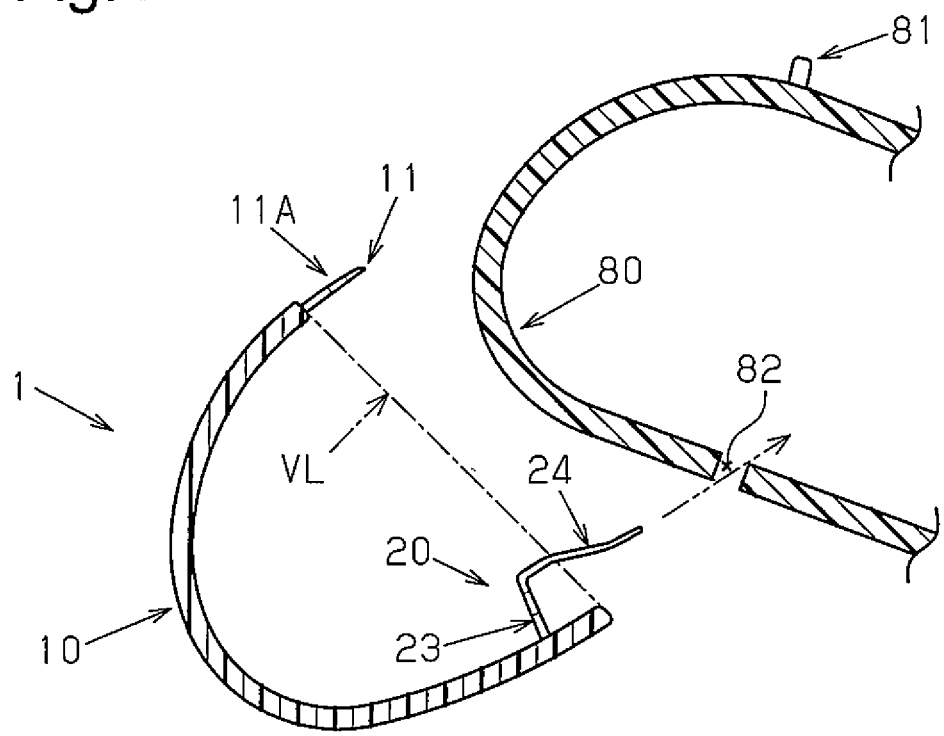
FIG. 4 is a schematic cross-sectional view showing a state immediately before a guide portion of the attachment piece is inserted into an attachment hole of a target section.

The covering portion 10 has a first side (upper side as viewed in FIG. 1) that includes an engagement portion 11, which is to be fixed to a vehicle engagement portion 81 located in the first side of the vehicle target section (see FIG. 4). The engagement portion 11 includes a through hole 11A for fixation to the vehicle engagement portion 81.

The covering portion 10 has a second side (lower side as viewed in FIG. 1) that includes the attachment piece 20, which is to be inserted into an attachment hole 82 located in the second side of the vehicle target section (see FIG. 4).

The covering portion 10, which includes the engagement portion 11, and the attachment piece 20 are formed integrally of plastic.

As shown in FIG. 3, the attachment piece 20 includes an upright portion 23, which extends upright from the covering portion 10, a guide portion 24, which extends from the distal end of the upright portion 23 and substantially in parallel to the plane of the covering portion 10 (toward the vehicle target section), and a through hole 20A, which is formed in the upright portion 23. The upright portion 23 and the guide portion 24 form a pivot portion 22.

The section of the attachment piece 20 that is connected to the covering portion 10 forms the thin integral hinge 21. As indicated by the long dashed double-short dashed lines in FIG. 3, the pivot portion 22 pivots about the integral hinge 21 in the directions of the arrows in FIG. 3 when external force is applied to the pivot portion 22. The pivot portion 22 returns to its original position when the external force is removed.

[Outline of Structure of Vehicle Target Section 80 and Procedure for Attaching Vehicle Exterior Member 1 to Target Section 80 (FIGS. 4 to 9)]

The outline of the structure of the target section 80 of a vehicle will now be described. FIGS. 4 to 9 show a cross section of the vehicle exterior member 1 that does not pass through the engagement portion 11 or the guide portion 24, and a cross section of the target section 80 that passes through the attachment hole 82.

As shown in FIGS. 4 to 9, the vehicle target section 80, which is a bumper cover of a vehicle for example, protrudes to form a bulge. The first side (upper side of the target section 80 as viewed in the drawings) of the vehicle target section 80 includes a vehicle engagement portion 81 that is a projection for fixing the first side of the vehicle exterior member 1 (specifically, the engagement portion 11). The second side (lower side of the target section as viewed in the drawings) includes an attachment hole 82 into which the second side of the vehicle exterior member 1 (specifically, the attachment piece 20) is inserted and fixed.

Thus, the vehicle target section 80 has a very simple structure.

A procedure for attaching the vehicle exterior member 1 to the vehicle target section 80 will now be described.

As shown in FIG. 4, an operator first inserts the guide portion 24 of the attachment piece 20, which is located in the second side of the covering portion 10, into the attachment hole 82 of the target section 80 as indicated by the long dashed double-short dashed line until the distal end of the upright portion 23 (i.e., the bent portion between the upright portion 23 and the guide portion 24) reaches the attachment hole 82. This positions the covering portion 10 in a temporary position relative to the vehicle target section 80.

As shown in FIG. 4, the distal end portion of the guide portion 24 of the attachment piece 20 extends in the direction opposite to the direction in which the curved vehicle exterior member 1 protrudes. This allows the operator to easily insert the guide portion 24 of the attachment piece 20 into the attachment hole 82.

Further, as shown in FIG. 4, the distal end portion of the guide portion 24 of the attachment piece 20 projects greatly from the covering portion 10 in the direction opposite to the covering portion 10 and beyond an imaginary line VL connecting the first side edge and the second side edge of the curved covering portion 10. This further facilitates insertion of the guide portion 24 of the attachment piece 20 into the attachment hole 82 by the operator.

Furthermore, as shown in FIG. 3, the guide portion 24 is tapered. This facilitates insertion of the guide portion 24 in the attachment hole 82 by the operator.

As shown in FIG. 3, the guide portion 24 includes small bends. Such a shape further facilitates insertion of the guide portion 24 into the attachment hole 82 by the operator.

Figure 5:
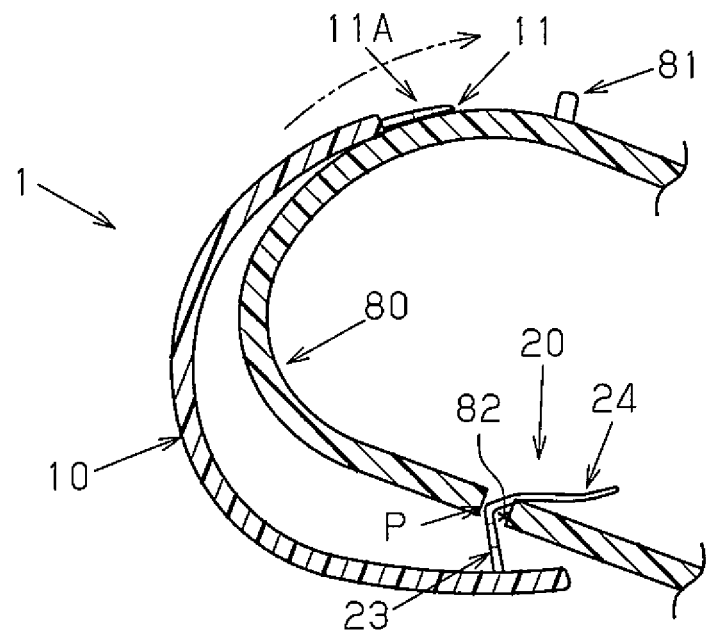
FIG. 5 is a schematic cross-sectional view showing a state in which a covering portion is rotated toward a vehicle engagement portion with the attachment piece inserted in the attachment hole.

As shown in FIG. 5, the operator then rotates the covering portion 10 about a contact position P where the rim of the attachment hole 82 contacts the attachment piece 20 (corresponding to the bent portion between the upright portion 23 and the guide portion 24) toward the vehicle engagement portion 81 (in the direction indicated by the arrow of long dashed double-short dashed line) while maintaining the insertion of the attachment piece 20 in the attachment hole 82.

Figure 6:
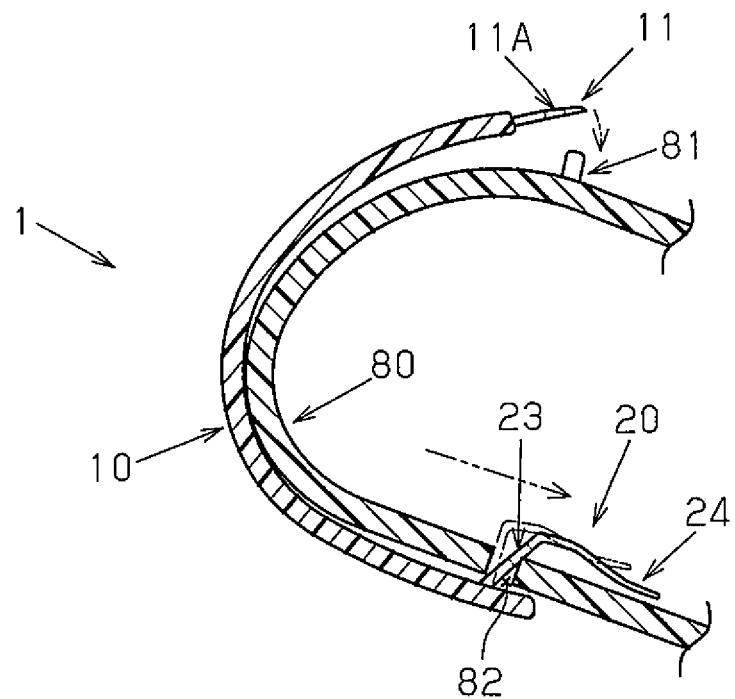
FIG. 6 is a schematic cross-sectional view showing a state in which the covering portion is pulled up toward the vehicle engagement portion with the attachment piece inserted in the attachment hole, and the attachment piece pivots.

When covering the target section with the covering portion 10, the operator pulls the covering portion 10 upward so that the engagement portion 11 of the vehicle exterior member 1 is located above the vehicle engagement portion 81 as shown in FIG. 6. Here, the attachment piece 20 contacts the rim of the attachment hole 82 (pressed by the rim of the attachment hole 82) as indicated by the broken line and pivots in the direction opposite to the direction in which the covering portion 10 is pulled. The pivoting of the attachment piece 20 about the integral hinge 21 enables the operator to easily pull the covering portion 10 upward to place the engagement portion 11 above the vehicle engagement portion 81.

Figure 7:
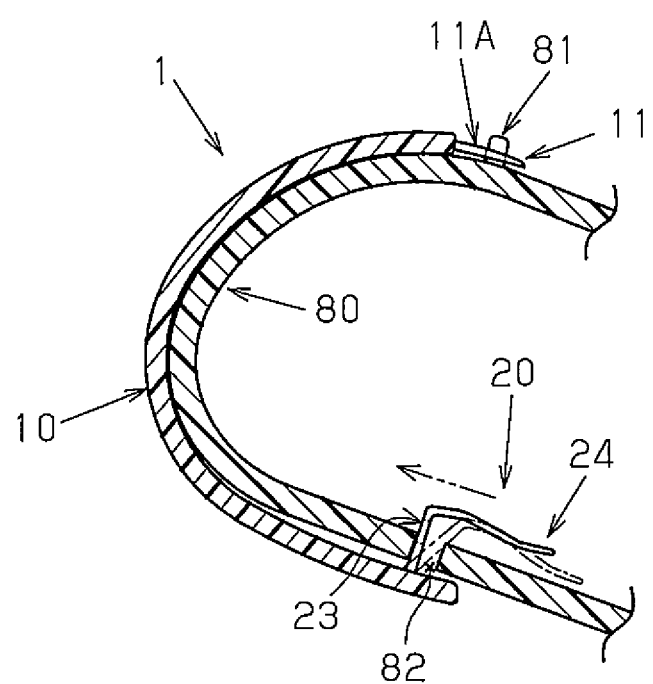
FIG. 7 is a schematic cross-sectional view showing a state in which an engagement portion is fixed to the vehicle engagement portion and the attachment piece has returned to the original position.

As shown in FIG. 7, the operator then brings the vehicle engagement portion 81 into engagement with the through hole 11A of the engagement portion 11 to fix the engagement portion 11 to the vehicle engagement portion 81. When the covering portion 10 covers the vehicle target section 80 and is positioned in a desired position, the force applied to the attachment piece 20 by the rim of the attachment hole 82 is reduced. This automatically returns the attachment piece 20 to the original position from the pivoted position indicated by the broken line. The engagement between the vehicle engagement portion 81 and the engagement portion 11 is thus maintained.

Figure 8:
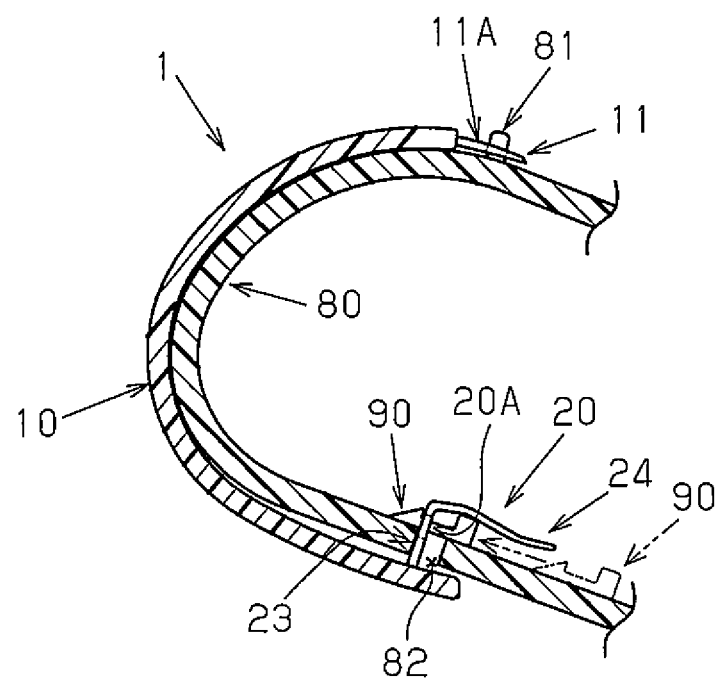
FIG. 8 is a schematic cross-sectional view showing a state in which a fastener is inserted into the attachment piece to fix the vehicle exterior member.

As shown in FIG. 8, the operator then inserts a wedge-shaped fastener 90 into the through hole 20A of the attachment piece 20 to fix the attachment piece 20 in the attachment hole 82. This fixes (fastens) the attachment piece 20 to the vehicle target section 80 with a simple structure.

Figure 9:
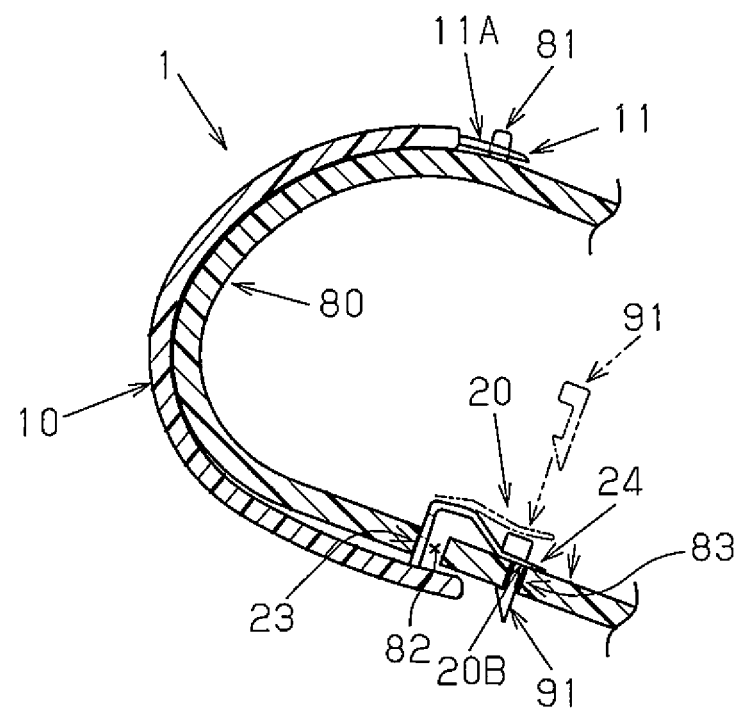
FIG. 9 is a schematic cross-sectional view showing another example in which a fastener is inserted into the attachment piece to fix the vehicle exterior member.

FIG. 9 shows another fixation method of the attachment piece 20 that differs from the method shown in FIG. 8. In this method, a through hole 20B is formed in the guide portion 24 of the attachment piece 20 instead of the through hole 20A in the upright portion 23 of the attachment piece 20, and a through hole 83 is formed in the position of the target section 80 that corresponds to the position of the through hole 20B when the covering portion 10 is placed in the attachment position. The guide portion 24 pivots from the position indicated by the broken line to the position indicated by the solid line to contact the vehicle target section, and a fastener 91 is inserted into the through hole 20B and the through hole 83 to fix the attachment piece 20.

The fasteners 90 and 91 are not limited to wedge-shaped components. Various kinds of fasteners, such as a nut and bolt or a grommet, may be used.

Figure 10A:
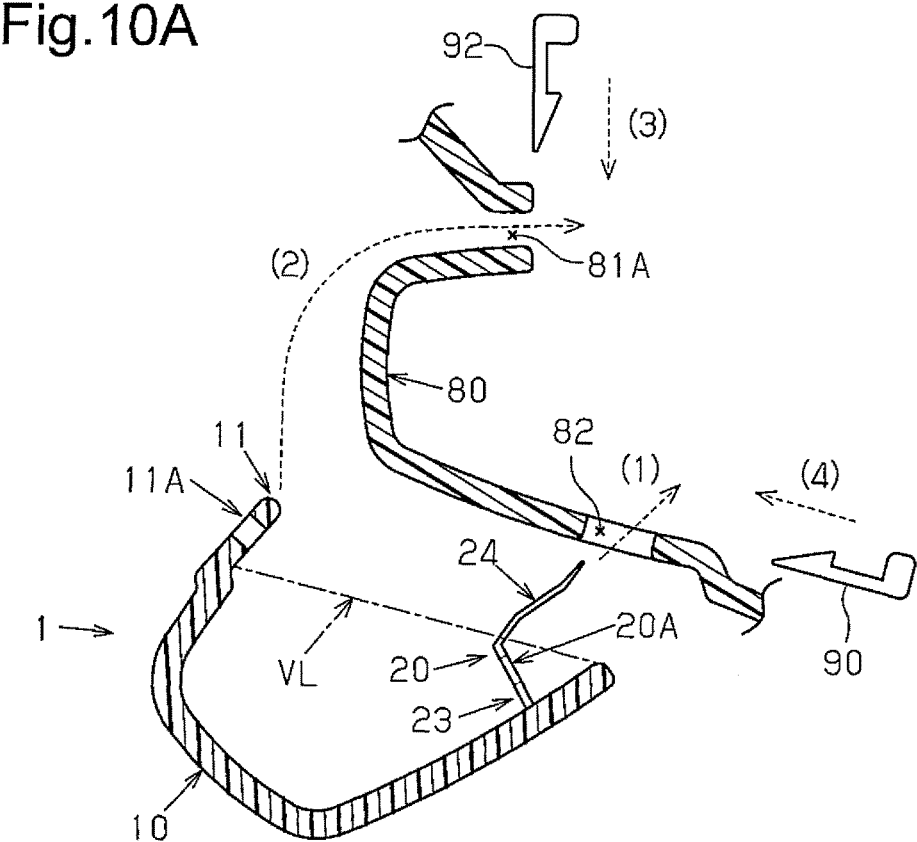
FIGS. 10A and 10B are schematic cross-sectional views showing a procedure in which a vehicle exterior member of another example is attached to a target section of a vehicle.
Figure 10B:
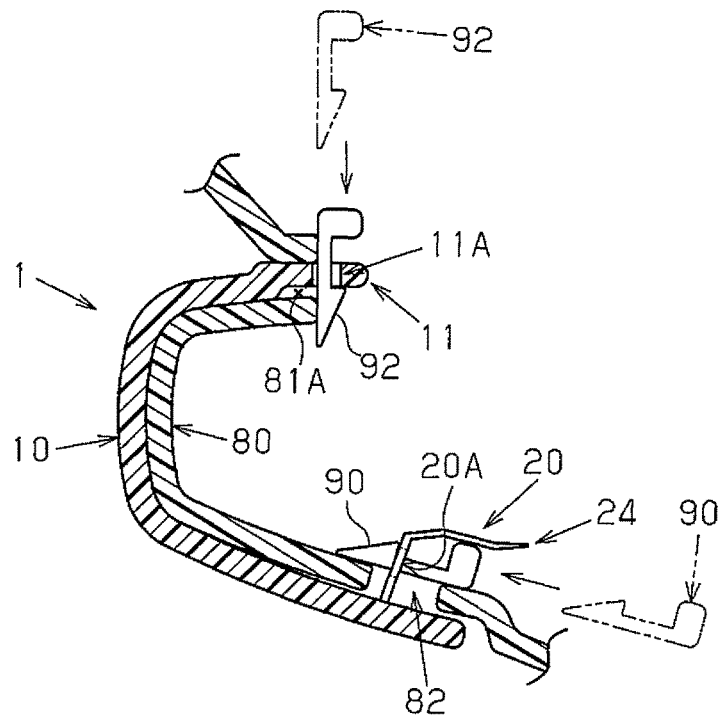

In the embodiment described above, the vehicle engagement portion located in the first side of the vehicle target section 80 is the projecting vehicle engagement portion 81. However, the vehicle engagement portion is not limited to such a structure. For example, as shown in FIGS. 10A and 10B, an attachment hole 81A may be located in the first side of the target section 80, the engagement portion 11 may be inserted into the attachment hole 81A, and the engagement portion 11 may be fixed by a fastener 92 from the back side of the target section 80. In this case, the attachment hole 81A of the target section 80 and the fastener 92 serve as the vehicle engagement portion. FIGS. 10A and 10B respectively show a cross section of the vehicle exterior member 1 that passes through the engagement portion 11 but not the guide portion 24 and a cross section of the target section 80 that passes through the attachment hole 82 and the attachment hole 81A.

For example, as shown in FIG. 10A, the operator inserts the guide portion 24 of the attachment piece 20 into the attachment hole 82 of the target section 80 in operation (1). Then, when covering the target section 80 with the covering portion 10, the operator pulls the covering portion 10 upward and inserts the engagement portion 11 into the attachment hole 81A of the target section 80 in operation (2) while maintaining the insertion of the guide portion 24 in the attachment hole 82. The covering portion 10 covers the target section 80 and is positioned in a desired position by operation (2). In operation (2), while the covering portion 10 is pulled upward, the attachment piece 20 pivots in the direction opposite to the direction in which the covering portion 10 is pulled, and when the covering portion 10 is positioned in the desired position (as shown in FIG. 10B), the attachment piece 20 pivots to the original position.

Then, the operator inserts the fastener 92 into the through hole 11A of the engagement portion 11 from the back side of the target section 80 in operation (3) and inserts the fastener 90 into the through hole 20A of the attachment piece 20 in operation (4). Since the vehicle exterior member 1 (covering portion 10) is positioned in the desired position in operation (2), either of operations (3) and (4) may be performed first.

In the attachment structure of the vehicle exterior member described in the above described embodiments, the attachment piece 20, which includes the integral hinge 21, is inserted into the attachment hole 82 before the covering portion 10 is engaged with the target section 80 of the vehicle. The attachment piece 20 functions as a guide for positioning the covering portion 10 in a temporary position relative to the vehicle target section 80. When the target section 80 is covered by the covering portion 10, the attachment piece 20 pivots about the integral hinge 21 and maintains the positioning of the covering portion 10 in the temporary position. This facilitates the attachment of the vehicle exterior member by the operator. The attachment piece 20, which includes the integral hinge 21, has the function of positioning the covering portion 10 (FIGS. 5 to 7) in addition to the conventional function of fastening to a vehicle (FIGS. 8, 9, and 10B). Thus, the vehicle exterior member 1 does not require a guide member that is dedicated for positioning. Since the guide member and the attachment piece do not have to be separate components, the vehicle exterior member 1 has a simpler structure, and the attachment piece 20 have a very simple shape.

The attachment structure of the vehicle exterior member of the present disclosure is not limited to the configuration, structure, and the like described in the above described embodiments. Various modifications, additions, and omissions are possible without departing from the scope of the present disclosure.

The features including the shapes of the vehicle exterior member and the target section of a vehicle and the attachment procedure of the vehicle exterior member are not limited to those described in the above described embodiments.

In the description of the above embodiments, a vehicle bumper molding is described as an example of a vehicle exterior member. However, the present disclosure is not limited to a vehicle bumper molding and is applicable to various vehicle exterior members, such as elongated side splash guards that are attached to opposite sides of a vehicle.

The invention claimed is:

1. An attachment structure for a vehicle exterior member, wherein the attachment structure attaches a vehicle exterior member to a protruding target section of a vehicle that includes a first side and a second side, the vehicle exterior member is curved to cover the target section, the attachment structure comprising:
    a vehicle engagement portion located on the first side of the target section;
    an attachment hole located on the second side of the target section;
    a covering portion that is located in the vehicle exterior member and configured to cover the target section, wherein the covering portion includes a first side and a second side;
    an engagement portion that is located on the first side of the covering portion and configured to engage with the vehicle engagement portion of the target section; and
    an attachment piece that is located on the second side of the covering portion to extend upright from the covering portion and configured to be inserted into the attachment hole of the target section; and
    a fastener configured to fix the attachment piece in the attachment hole, wherein the attachment piece includes a through hole for receiving the fastener,
wherein
    the covering portion and the attachment piece are formed integrally of plastic,
    a section of the attachment piece that is connected to the covering portion forms a thin integral hinge, and
    the attachment piece is configured such that:
    when the attachment piece is inserted into the attachment hole, the attachment piece positions the covering portion at a temporary position relative to the target section;
    when the covering portion is pulled toward the vehicle engagement portion and the attachment piece is pressed against a rim of the attachment hole, the attachment piece pivots in a direction opposite to a direction in which the covering portion is pulled while remaining inserted in the attachment hole; and
    when the engagement portion of the covering portion is engaged with the vehicle engagement portion so that the covering portion covers the target section and is positioned in a desired position, the attachment piece returns to an original position and maintains engagement between the vehicle engagement portion and the engagement portion.

2. The attachment structure for a vehicle exterior member according to claim 1, wherein
    after the covering portion covers the target section and is positioned in the desired position and the attachment piece returns to the original position, the fastener is inserted into the through hole of the attachment piece so that the attachment piece is fixed in the attachment hole.

3. The attachment structure for a vehicle exterior member according to claim 1, wherein the attachment piece includes a distal end portion that extends in a direction opposite to a direction in which the covering portion protrudes.

4. The attachment structure for a vehicle exterior member according to claim 3, wherein the attachment piece extends in a direction opposite to the covering portion and beyond an imaginary line that connects an edge of the first side of the covering portion and an edge of the second side of the covering portion.

5. The attachment structure for a vehicle exterior member according to claim 1, wherein the attachment piece includes an upright portion, which extends upright from the covering portion, and a guide portion, which extends from a distal end of the upright portion in a direction opposite to a direction in which the covering portion protrudes.

6. A method for attaching a vehicle exterior member, wherein the method attaches a vehicle exterior member to a protruding target section of a vehicle that includes a first side and a second side, the vehicle exterior member is curved to cover the target section,
    the target section includes a vehicle engagement portion on the first side,
    the target section includes an attachment hole on the second side,
    the vehicle exterior member includes a covering portion that is configured to cover the target section and includes a first side and a second side,
    the covering portion includes on its first side an engagement portion that is configured to engage with the vehicle engagement portion of the target section,
    the covering portion includes on its second side an attachment piece that is configured to be inserted into the attachment hole of the target section and extends upright from the covering portion,
    the covering portion and the attachment piece are formed integrally of plastic,
    a section of the attachment piece that is connected to the covering portion forms a thin integral hinge, the method comprising:
    positioning the covering portion in a temporary position relative to the target section by inserting the attachment piece into the attachment hole;
    pulling the covering portion toward the vehicle engagement portion such that the attachment piece is pressed against a rim of the attachment hole and pivots in a direction opposite to a direction in which the covering portion is pulled while remaining inserted in the attachment hole; and
    engaging the engagement portion of the covering portion to the vehicle engagement portion, thereby positioning the covering portion such that the covering portion covers the target section and is positioned in a desired position, wherein the attachment piece returns to an original position and maintains engagement between the vehicle engagement portion and the engagement portion, wherein a fastener is provided for fixing the attachment piece in the attachment hole, and wherein the attachment piece includes a through hole for receiving the fastener.

7. The method for attaching a vehicle external member according to claim 6, further comprising
fixing the attachment piece in the attachment hole by inserting the fastener into the through hole formed in the attachment piece after the covering portion covers the target section and is positioned in the desired position and the attachment piece returns to the original position.

\* \* \* \* \*